(12) United States Patent
Martin et al.

(10) Patent No.: US 8,543,117 B2
(45) Date of Patent: Sep. 24, 2013

(54) PRIORITIZING RADIO ACCESS TECHNOLOGIES

(75) Inventors: Brian Alexander Martin, Farnham (GB); Christopher Peter Callender, Dollar (GB)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/524,251

(22) Filed: Jun. 15, 2012

(65) Prior Publication Data

US 2013/0084866 A1 Apr. 4, 2013

Related U.S. Application Data

(63) Continuation of application No. 13/251,363, filed on Oct. 3, 2011.

(51) Int. Cl.
*H04W 36/00* (2009.01)
(52) U.S. Cl.
USPC ........... 455/437; 455/525; 455/435; 455/436; 455/450; 455/553
(58) Field of Classification Search
USPC .............. 455/437, 525, 435.3, 436, 450, 449, 455/553, 435.2, 67.1
See application file for complete search history.

(56) References Cited

U.S. PATENT DOCUMENTS

| 2004/0023634 A1 | 2/2004 | Jeong et al. ................... 455/403 |
| 2007/0004445 A1* | 1/2007 | Dorsey et al. ................ 455/525 |
| 2008/0268843 A1* | 10/2008 | Ore et al. .................... 455/435.3 |
| 2008/0287127 A1 | 11/2008 | Wu et al. ....................... 455/434 |
| 2009/0047958 A1* | 2/2009 | Rimhagen et al. ............ 455/436 |
| 2009/0088160 A1* | 4/2009 | Pani et al. ..................... 455/436 |
| 2009/0124249 A1 | 5/2009 | Young et al. ................. 455/422.1 |
| 2009/0239535 A1 | 9/2009 | Chun et al. .................. 455/435.2 |
| 2009/0303891 A1* | 12/2009 | Lucas et al. ................... 370/252 |
| 2010/0255849 A1* | 10/2010 | Ore .............................. 455/450 |

FOREIGN PATENT DOCUMENTS

| WO | WO 98/59448 | 12/1998 |
| WO | WO-98/59448 A2 | 12/1998 |

OTHER PUBLICATIONS

"$3^{rd}$ Generation Partnership Project; Technical Specification Group Radio Access Network; User Equipment (UE) procedures in idle mode and procedures for cell reselection in connected mode (Release 9)", 3GPP TS 25.304 V9.3.0, Sep. 2010, 50 pgs.

(Continued)

*Primary Examiner* — Meless N Zewdu
*Assistant Examiner* — Jean Chang
(74) *Attorney, Agent, or Firm* — Stanton IP Law (57) ABSTRACT

A prioritized measurement list is stored in a memory, and each entry in the prioritized measurement list defines a unique combination of frequency layer and radio access technology for a serving cell and for neighbor cells. Based on at least signal strength of the serving cell, there is selected, from a neighbor list according to the prioritized measurement list, a set of entries for measuring according to a selection rule. The selection rule provides: for the case in which the signal strength of the serving cell is relatively high, the selected set is a first set and represents higher priority ones of the prioritized measurement list; and for the case in which the signal strength of the serving cell is relatively low, the selected set is a second set and represents lower priority ones of the prioritized measurement list.

17 Claims, 3 Drawing Sheets

(56) References Cited

OTHER PUBLICATIONS

"3rd Generation Partnership Project; Technical Specification Group Radio Access Network; Requirements for support of radio resource management (FDD) (Release 10)", 3GPP TS 25.133 V10.0.0, Section4.2.2.5a, Dec. 2010, 15 pgs.

3GPP TSG-RAN WG4 Meeting #46bis, Nokia, "Scheduling of LTE Measurement Gaps for Inter-Frequency and Inter-RAT Monitoring", R4-081074, (May 4-9, 2008), (5 pages).

3GPP TSG-RAN Meeting #52, Renesas, "WID Update to Further Enhancements to CELL_FACH", RP-110913, (May 31-Jun. 3, 2011), (5 pages).

3GPP TSG-RAN WG2 Meeting #75, Renesas, "Addition of Measurements and Reselection from UTRAN CELL_FACH to E-UTRAN", R2-114351, (Aug. 22-26, 2011), (11 pages).

3GPP TSG-RAN WG2 Meeting #74, Barcelona, Renesas Mobile Europe Ltd, TeliaSonera Ericsson, ST-Ericsson: "Reselection from UTRAN CELL FACH state to EUTRAN" 3rd Generation Partnership Project (3GPP), Mobile Competence Centre ; 650, Route des Lucioles, vol. R2-113383, May 12, 2011 pp. 1-4,XP002691654,Barcelona, Spain,Retrieved from the Internet:URL:http://www.3gpp.orgjftpjtsg_ranjWG2_RL2/ TSGR2_74/Docs; Measurements and reselection to high priority layers;p. 3, paragraph 2.2—p. 4.

3GPP TSG-RAN WG2 Meeting #60bis; Nokia Corporation et al: "Discussion on various Idle Mode open items", 3GPP Draft; RZ-080175 E-UTRA Reselection Considerations_V3, 3rd Generation Partnership Project (3GPP), vol. RAN WG2, No. Sevilla, Spain; Jan. 8, 2008,XP050138054,Measurment rules p. 1, paragraph 2.1; Priority handling p. 2, paragraph 2.3; Measurement Rules p. 3, paragraph 2.4.

"3rd Generation Partnership Project;Technical Specification Group Radio Access Network; Evolved Universal Terrestrial Radio Access (E-UTRA); User Equipment (UE) procedures in idle mode (Release 10)", 3GPP Standard; 3GPP TS 36.304, 3rd Generation Partnership Project (3GPP), vol. RAN WG2, No. V10.2.0, Jun. 21, 2011, pp. 1-33, XP050553465, Reselection priorities handling p. 18, paragraph 5.2.4.1; Measurement rules for cell re-selection p. 18, paragraph 5.2.4.2—p. 19.

3GPP TSG-RAN WG4 Meeting #59, Barcelona, Spain, May 9-13, 2011;Renesas Mobile Europe Ltd et al: "Inter-RAT UMTS to LTE Reselection",3GPP Draft; R4-112967, 3rd Generation Partnership Project (3GPP), vol. Ran WG4, No. Barcelona, Spain; May 9, 2011, May 3, 2011, XP050502434,Introduction p. 1, paragraph 1; CELL FACH Reselection requirements p. 4, paragraph 4—p. 5.

\* cited by examiner

PRIORITIZING RADIO ACCESS TECHNOLOGIES

CROSS REFERENCE TO RELATED APPLICATIONS

This patent application is a continuation application under 35 USC §120 and 37 CFR 1.53(b) of co-pending U.S. patent application Ser. No. 13/251,363 (filed Oct. 3, 2011), and also claims priority under 35 U.S.C. 119(a) and 37 CFR 1.55 from UK Patent Application Serial No. GB1116979.4 (filed Oct. 3, 2011). The subject matter detailed herein is also related to co-owned U.S. patent application Ser. No. 13/023,675 (filed Feb. 9, 2011) and entitled PRIORITY MEASUREMENT RULES FOR CHANNEL MEASUREMENT OCCASIONS.

TECHNICAL FIELD

The exemplary and non-limiting embodiments of this invention relate generally to wireless communication systems, methods, devices and computer programs, and more specifically relate to selecting neighbor cells, both inter-frequency and inter-radio access technology, for measurements by a user equipment.

BACKGROUND

The following abbreviations that may be found in the specification and/or the drawing figures are defined as follows:

| | |
|---|---|
| 3GPP | third generation partnership project |
| E-UTRAN | evolved UTRAN (LTE) |
| FACH | forward access channel |
| GERAN | GSM-enhanced data rates for global evolution (EDGE) |
| GSM | global system for mobile communications |
| LTE | long term evolution |
| RAT | radio access technology |
| RSRQ | reference signal received quality |
| SI | system information |
| SIB | system information block |
| SINR | signal to interference plus noise ratio |
| TDD | time division duplex |
| UE | user equipment |
| UTRAN | universal terrestrial radio access network |

Co-owned U.S. patent application Ser. No. 13/023,675 concerns measuring inter-frequency and inter-RAT neighbor cells and describes that the UE's measurement occasions are used for different neighbor cells depending on whether the UE has good or marginal coverage with its serving cell. It describes a priority re-selection algorithm in the E-UTRAN system by which the network can prioritize measurements of either a frequency layer or a RAT over another, so as to more efficiently use the available measurement occasions depending on the strength of the serving cell. Basic coverage is more important when the serving cell is weak. Service, such as looking for hot spot coverage to enable additional or enhanced mobile services beyond simply cellular call coverage, is more important when signal strength from the serving cell is stronger and maintaining a basic connection with the serving cell is not reasonably in doubt over the near term. In the former instance the above co-owned application prioritizes a lower priority neighbor cell search to better assure an alternate cell for maintaining connectivity in case signal strength from its serving cell deteriorates further, whereas in the latter instance the UE can override the 3GPP Release 99 measurement purposes and use its measurement occasions to detect high priority RATs and/or inter-frequencies that might offer enhanced services such as the increased data rates available through the E-UTRAN system.

The above co-owned application used two different thresholds $S_{prioritysearch1}$ and $S_{prioritysearch2}$ against which the serving cell signal strength was compared. If the received power and quality of the serving cell goes below either then the UE needs to perform a search on the GERAN and UTRAN RATs meeting the specified performance requirements. If the strength and quality of the serving cell is above both thresholds then the UE is not required to measure the lower priority RATs, and hence what was in the prior art as "spare" measurement occasions are instead used to measure the higher priority LTE RAT. This enables the UE to switch between coverage or service based measurements depending on the quality of the serving cell.

The 3GPP organization is now exploring measurements and reselections for a UE in the CELL_FACH state to the E-UTRAN (LTE) system. See for example document RP-110913 entitled WID UPDATE TO FURTHER ENHANCEMENTS OF CELL_FACH by Renesas Mobile Europe, TeliaSonera, Ericsson and ST-Ericsson (3GPP TSG-RAN Meeting #52; Bratislava, Slovakia; 31 May to 3 Jun. 2011) and RP-111321 entitled UPDATED WID: FURTHER ENHANCEMENTS TO CELL_FACH by Renesas Mobile Europe, TeliaSonera, Ericsson and ST-Ericsson (3GPP TSG-RAN Meeting #53; Fukukoa, Japan; 13 Sep. to 16 Sep. 2011). If one extends this principle to GERAN and UTRAN also, there would need to be a search in the various different RATs to maintain basic coverage for the UE.

The invention of the co-owned application above can be implemented so as not to impact the conventional performance for search and measurement of GERAN and UTRAN RATs. To extend that so that E-UTRAN is included in the low priority coverage search is not so straightforward because there are multiple frequency layers in GERAN, UTRAN and E-UTRAN which means that performing measurements on E-UTRAN may compromise the performance of GERAN and UTRAN measurements, similar to the 30% degradation the background section of that co-owned application details.

SUMMARY

In a first exemplary embodiment of the invention there is an apparatus comprising a processing system having at least one processor and at least one memory including computer program code. In this embodiment the processing system is configured with the at least one processor to cause the apparatus at least to: store in the at least one memory a prioritized measurement list, each entry in the prioritized measurement list defining a unique combination of frequency layer and radio access technology for a serving cell and for neighbor cells; and based on at least signal strength of the serving cell, select from a neighbor list according to the prioritized measurement list a set of entries for measuring according to a selection rule. The selection rule provides: for the case in which the signal strength of the serving cell is relatively high, the selected set is a first set and represents higher priority ones of the prioritized measurement list; and for the case in which the signal strength of the serving cell is relatively low, the selected set is a second set and represents lower priority ones of the prioritized measurement list. In an embodiment the selecting may be based on signal strength and signal quality of the serving cell.

In a second exemplary embodiment of the invention there is a method comprising: storing in a computer readable memory a prioritized measurement list, each entry in the prioritized measurement list defining a unique combination of frequency layer and radio access technology for a serving cell and for neighbor cells; and based on at least signal strength of the serving cell, selecting from a neighbor list according to the prioritized measurement list a set of entries for measuring according to a selection rule. The selection rule provides: for the case in which the signal strength of the serving cell is relatively high, the selected set is a first set and represents higher priority ones of the prioritized measurement list; and for the case in which the signal strength of the serving cell is relatively low, the selected set is a second set and represents lower priority ones of the prioritized measurement list. In an embodiment the selecting may be based on signal strength and signal quality of the serving cell.

In a third exemplary embodiment of the invention there is a memory tangibly storing a computer program that is executable by at least one processor, in which the computer program comprises: code for storing in a computer readable memory a prioritized measurement list, each entry in the prioritized measurement list defining a unique combination of frequency layer and radio access technology for a serving cell and for neighbor cells; and code for, based on at least signal strength of the serving cell, selecting from a neighbor list according to the prioritized measurement list a set of entries for measuring according to a selection rule. The selection rule provides: for the case in which the signal strength of the serving cell is relatively high, the selected set is a first set and represents higher priority ones of the prioritized measurement list; and for the case in which the signal strength of the serving cell is relatively low, the selected set is a second set and represents lower priority ones of the prioritized measurement list. In an embodiment the selecting may be based on signal strength and signal quality of the serving cell.

DETAILED DESCRIPTION

Exemplary embodiments of these teachings may be combined with those of the co-owned application referenced above; that is, there may be selected different sets of entries from the priority list depending on whether the UE is searching for purposes of maintaining coverage or for obtaining enhanced services, and the coverage/services distinction is determined at least in part based on the UE's received signal strength or signal quality of its serving cell. But certain embodiments of these teachings can also stand apart from the co-owned application since these teachings describe a different way of prioritizing measurements and various ways of selecting from that prioritized measurement list.

While the examples below are in the context of a UE in the CELL_FACH state having a UTRAN serving cell and neighbor cells in the UTRAN, GERAN and LTE systems, neither the UE's mobility state nor those example RATs are limiting to the broader aspects of these teachings. In that regard the UE in the idle or connected states under control of an E-UTRAN serving cell can also practice these teachings. This is true even though the CELL-FACH state in UTRAN may be considered analogous to a hybrid between the idle and connected states in E-UTRAN, and despite the E-UTRAN idle-state UE having enough time to take more measurements than a UE in either the connected or CELL-FACH state.

Figure 1:
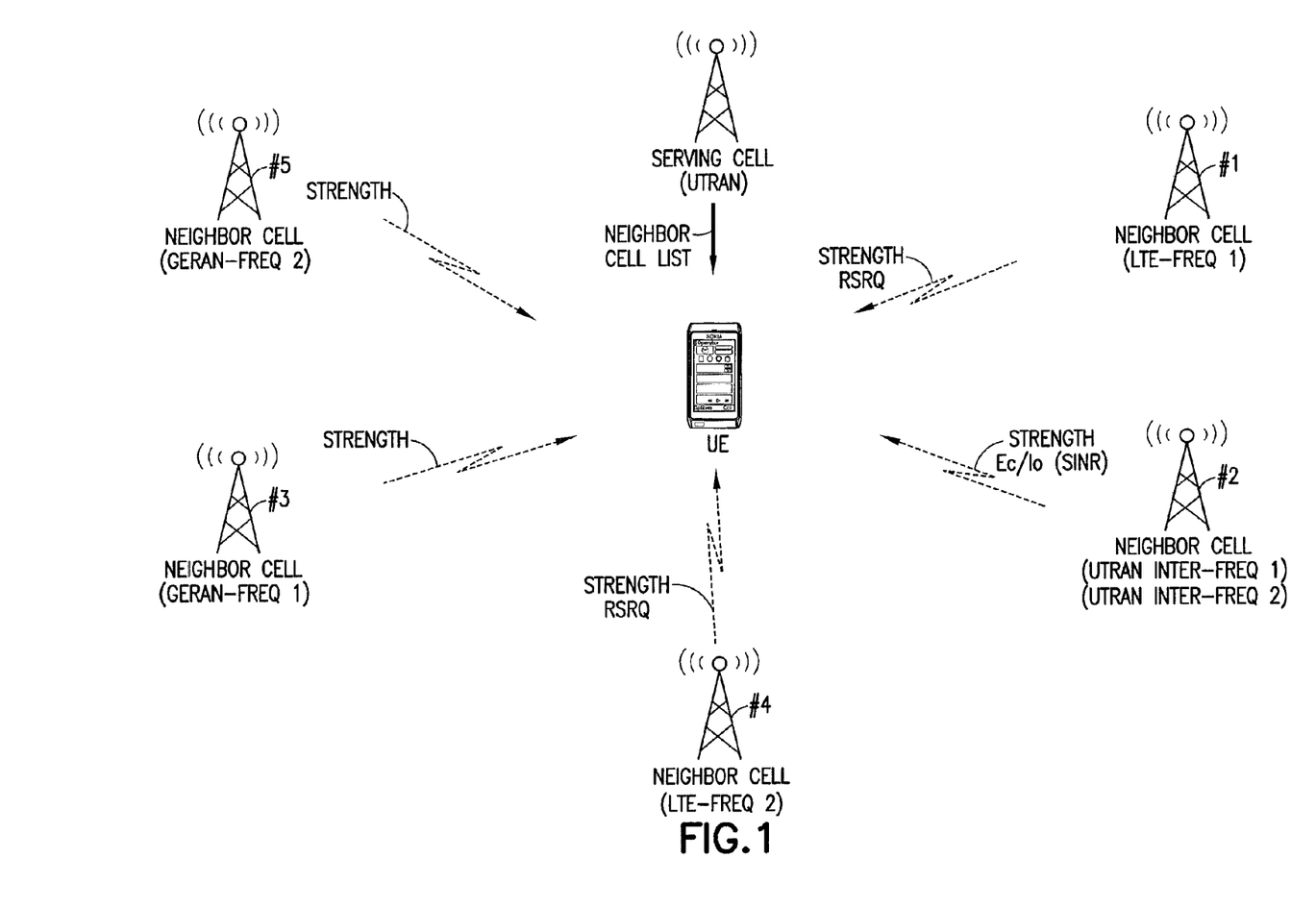
FIG. 1 is a schematic diagram showing a user equipment and multiple inter-frequency and inter-RAT neighbor cells about a serving cell, and illustrates an exemplary environment in which embodiments of these teachings may be practices to advantage.

FIG. 1 shows an exemplary environment in which embodiments of the invention may be practiced to advantage. There is a UE under control of a UTRAN serving cell, and for purposes of the examples below there are five arbitrarily numbered neighbor cells as follows: neighbor cell #1 is operating on LTE frequency #1 and so is an inter-RAT neighbor cell respecting the serving cell; neighbor cell #2 is operating on UTRAN frequencies #1 and #2 which are inter-frequencies to the UTRAN frequency of the serving cell; neighbor cell #3 is a operating on GERAN frequency #1 and so is an inter-RAT neighbor cell; neighbor cell #4 is operating on LTE frequency #2 and so is an inter-RAT neighbor cell; and neighbor cell #5 is operating on GERAN frequency #2 and so is an inter-RAT neighbor cell. Whether a neighbor cell is inter-RAT or inter-frequency is relative to the serving cell. In some deployments a single neighbor base station operating on multiple RATs simultaneously may be both inter-RAT and inter-frequency, but for clarity it will be considered as two 'cells' just as each frequency layer of neighbor cell #2 may be considered a separate inter-frequency cell. It is convenient to consider each different neighbor cell frequency, whether it is inter-frequency or inter-RAT, as a distinct frequency layer.

It is conventional that the serving cell provide to its UE a neighbor cell list which the UE uses to learn which frequencies to monitor and measure for mobility purposes. The UE will measure the neighbor cells on its list during its measurement opportunities, at which times the serving cell knows not to transmit to the UE since the assumption is the UE has one RF receive chain and cannot simultaneously receive on two frequencies. FIG. 1 shows the UE can measure signal strength, or a quality measure from the neighbor cells' transmissions.

According to embodiments presented herein the UE will prioritize the members of its neighbor cell list and measure them according to those priorities, during its scheduled measurement opportunities or natural DRX based measurements. Depending on the specific embodiment, the network can exert some limited control or total control over how the priorities are set so it can control to one extent or another from which neighbor cells it will receive measurements via the UE. Each entry on the prioritized list which is stored in the UE's local memory, and which the UE accesses each time it needs to check which cells to measure, defines a unique combination of RAT and frequency. That is, there is a distinct entry in the list for each frequency layer. If the neighbor cell list which the serving cell provides to the UE includes every frequency layer shown at FIG. 1, the list would have a total of 7 entries (including the serving cell UTRAN frequency). The UE utilizes a rule to select from its prioritized list of set of entries for measuring. Seven is typically too many layers to measure with good performance, so the rule would operate to exclude some entries. A rule that operates to exclude certain entries as in the examples below is identical in effect to an inverse of the same rule which operates to include all of the opposed entries, so both inclusionary rules and exclusionary rules are encompassed by these teachings regardless of the specific examples below. One aspect of such a rule is that it will always select from the list entries representing at least two RATs for the UE to measure.

As will be seen from the examples below, when combined with the teachings of the above-referenced co-owned application applying the rule while the UE is seeking coverage (when serving cell signal strength or quality is below a threshold) will operate to exclude higher priority list entries and return a set of entries to measure that is biased to the lower priority neighbor cell frequency layers, to better assure an alternate cell is available to maintain coverage. And when the rule is applied while the UE is seeking enhanced services (when serving cell signal strength is above a threshold) it will operate to exclude lower priority entries and return a set of entries to measure that is biased to the higher priority neighbor cell frequency layers, to better aid the UE in finding those enhanced services. But in all cases the rule will return entries representing at least two RATs.

First consider generating the prioritized measurement list. At least whenever the UE's received signal strength from its serving cell falls below a threshold (e.g., relatively low), the UE will prioritize all of the frequency layers when the serving cell quality goes below a threshold and the UE is performing coverage based measurements. For those instances in which there is an LTE cell in the neighbor cell list, this allows the UE to consider including one or more LTE frequency layers for measurement in a coverage limited scenario.

There are various implementations for how this list is generated. In one embodiment the measurement list is organized according to an absolute priority which is also used to prioritize reselections themselves. In this embodiment the rule, or set of rules, is implicit in that the UE applies them anytime the neighbor cell list includes three or more RATs. In this case the implicit rule is to drop or exclude from the measurement set all of the entries associated with one of the three RATs, so the UE is required to measure no more than two RATs, particularly for the coverage limited case (low signal strength from the serving cell). This embodiment is fairly simple to specify and implement as only minimum signalling changes are required as compared to conventional practice. The network can maintain control over which RATs are retained and which is excluded from the measurement set in that it can, if needed, send dedicated signalling to individual UEs giving RAT-specific absolute priorities for reselection of cells once they have been detected and measured. For example, in the coverage limited case the lowest priority RAT can be excluded from the selected measurement set and prioritize the RAT(s) assigned the highest absolute priorities, and/or may instead exclude the highest priority RAT since it is already measured in the non-coverage limited case (where serving cell signal strength is good and the measurements are biased to find enhanced services) and instead prioritize measurements of the lower priority RAT(s) which are not measured in the non-coverage limited case.

In a variation of the above embodiment there is introduced a new information demerit to indicate to the UE the measurement priority of the E-UTRAN RAT. This would be an explicit indication whether the UE should drop GERAN or UTRAN in order to measure LTE. The additional signaling of this new information element has the same result as the inherent rule above but in this case the network does not need to modify the absolute priority information by signalling dedicated priorities, which can be valid as the UE hands over across multiple cells, in order to achieve the correct prioritization in a particular cell or scenario, but rather modifies sends the new information element with a different RAT measurement priority. When applying the rule to the neighbor cell list the UE only needs to drop GERAN or UTRAN if the neighbor cell list includes GERAN, UTRAN and LTE neighbor cells. In case the neighbor cell list has only cells of two RATs then the rule does not exclude any of the RATs and the UE's measurement set includes both RATs.

In another embodiment the network signals to the UE a new information element that indicates a 'weight' for each RAT, for example a value between zero and one. This embodiment is a bit more complex to implement but gives the network full control of the measurement performance. The network operator may choose to compromise only GERAN performance to fit in LTE performance, so for example GERAN and LTE measurements take a lesser share of the available measurement occasions or natural DRX gaps but UTRAN measurements take a greater share. The network operator may choose to impact GERAN and UTRAN only slightly, and cause the UE to perform limited LTE measurements. In this manner the network can more finely tune the UE's measurement performance, based on the deployment of neighbor cells and frequency layers.

For the case in which there are UEs which support the above prioritization rules and legacy UEs which do not, the UEs which do support it can indicate such to the network, such as in the UE context the serving cell fetches from the UE's home network or from signalling directly from the UE when it becomes active in the serving cell.

The network can signal the RAT measurement priority in broadcast system information, or in dedicated signalling, or both for example by broadcasting a cell-wide RAT measurement priority which it overwrites per-UE when needed. Below are exemplary procedures for how and when the UE begins its measurements in general. A new information element to implement these teachings, and detailed further below, may in one embodiment be included where the "FACH measurement occasion info" is mentioned in the two paragraphs immediately below.

Upon transition from CELL_DCH to CELL_FACH/CELL_PCH/URA_PCH state, the UE shall:

---

1> stop the inter-RAT type measurement reporting assigned in a MEASUREMENT CONTROL message;
1> delete the measurements of type inter-RAT associated with the variable MEASUREMENT_IDENTITY and delete the corresponding compressed mode pattern stored in the variable TGPS_IDENTITY;
1> begin monitoring cells listed in the IE "inter-RAT cell info list" received in System Information Block type 12 (or System Information Block type 11);
1> begin monitoring E-UTRA frequencies listed in the IE "E-UTRA frequency and priority info list" received in System Information Block type 19.
1> in CELL_FACH state:
  2> for FDD if variable HS_DSCH_RECEPTION_CELL_FACH_STATE is set to TRUE and the variable HS_DSCH_DRX_CELL_FACH_STATUS is set to TRUE:
    3> perform measurements on other systems during the frame(s) with a specific SFN value.
  2> otherwise:
    3> perform measurements on other frequencies according to the IE "FACH measurement occasion info";
    3> perform measurements on other systems, according to the IE "FACH measurement occasion info".

---

Upon transition from idle mode to CELL_FACH state, the UE shall:

1> begin or continue monitoring cells listed in the IE "inter-RAT cell info list" received in System Information Block type 12 (or System Information Block type 11);
1> continue monitoring the list of E-UTRA frequencies assigned in the IE "E-UTRA frequency and priority info list" in System Information Block type 19;
1> for FDD, if variable HS__DSCH__RECEPTION__CELL__FACH__STATE is set to TRUE and the variable HS__DSCH__DRX__CELL__FACH__STATUS is set to TRUE:
   2> perform measurements on other systems, during the frame(s) with a certain SFN value.
1> otherwise:
   2> perform measurements on other systems, according to the IE "FACH measurement occasion info".
1> for TDD:
   2> perform measurements on other frequencies according to the IE "FACH measurement occasion info".

Below are three examples of the absolute priority embodiment detailed above. In these embodiments the UE simply chooses the two RATs to be measured according to the standardized rules based on an absolute priority in the prioritized neighbor cell list, and performs measurements meeting the similar performance as in conventional measurements. Since the rules which select a set from the prioritized list in this case return no more than two RATs, the third (and fourth if one exists) RAT is not measured. By example such prioritization rules might conveniently be specified for UTRAN in 3GPP TS 25.304 (procedure) and/or 25.133 (performance). In a first example the neighbor cell list includes five entries or frequency layers, which the rule prioritizes as follows:

LTE (freq1) priority 1
   UTRAN (serving) priority 2
   UTRAN (inter-freq 1) priority 2
   UTRAN (inter-freq 2) priority 3
   GERAN (32 ARFCNs) priority 4

For this first example the rule is to drop measurements of the highest priority RAT if there are three or more RATs in the neighbor cell list. So in this case the UE shall prioritize measurements of UTRAN and GERAN low priority layers for the case of coverage based measurements (low signal strength and quality from the serving cell) and drop the higher priority LTE. For the case of service based measurements the UE shall measure LTE and UTRAN and drop the lower priority RAT GERAN.

In a second example the neighbor cell list includes four entries or frequency layers, which the rule prioritizes as follows:

LTE (freq1) priority 1
   UTRAN (serving) priority 2
   UTRAN (inter-freq 1) priority 2
   UTRAN (inter-freq 2) priority 3

For this second example, the UE shall prioritize measurements of UTRAN and LTE layers in case of coverage based measurements. In case of service based measurements the UE shall measure LTE. The difference between the first and second examples is that in the second there are only two RATs in the neighbor cell list provided by the network to the UE, and so the rule will always return a measurement set having them both.

In a third example the neighbor cell list includes seven entries or frequency layers, which the rule prioritizes as follows:

LTE (freq1) priority 1
   UTRAN (inter-freq 1) priority 2
   GERAN (freq1) priority 3
   UTRAN (serving) priority 4
   LTE (freq2 priority 5
   GERAN (freq2) priority 6
   UTRAN (inter-freq 2) priority 7

For this third example, the rule is that the UE drop the lowest priority RAT from the prioritized list to obtain its measurement set, meaning that the UE shall select for the measurement set the highest priority layer and compare. In this third example above the UE shall prioritize LTE and UTRAN for the case of coverage based measurements and drop GERAN, and for the case of service based measurements the UE shall measure all three of LTE, GERAN and UTRAN (which is allowable for the service based application of the rule since maintaining coverage is not a primary concern and the performance requirement is sufficiently relaxed to allow all three RATs to be measured within the specified limits).

Other embodiments may employ different variations to the measurement set selection rule other than dropping the highest or lowest RAT or entry from the prioritized neighbor cell list. Any of the above embodiments may be implemented by signalling a new information element from the network to the UE which includes a BOOLEAN operator for example to determine whether the lowest or the highest priority RAT should be dropped. Such a BOOLEAN operator is readily configurable by the network to maintain control over which neighbor frequency layers get reported under various conditions of serving cell received signal strength at the UE.

Now consider an example of the embodiment detailed above in which the network signals a weighting factor for the various RATs in the neighbor cell list. For example, the RAT-specific weighting factor may be selected from {0,1} meaning the UE is to measure cells in the 1-weighted RAT and is to not measure cells in the 0-weighted RAT (e.g., the weighting factors indicate either measure or don't measure). If as above a new information element is used to indicate to the UE the priority of E-UTRAN/LTE, such a priority indication may be selected by the network from the set consisting of {GERAN, UTRAN, none}. This indicates which RAT should be dropped in favor of LTE measurements. If "none" is selected and sent in this new information element, then LTE will be measured only if there are no GERAN neighbors, or no UTRAN neighbors with a priority and threshold (for example, this can occur depending on the dedicated signalling of RAT priority information). In one implementation this new information element will have enumerated values to specify which RATs will be dropped (or alternatively which RATs will be measured). This also can be specified in the 3GPP TS 25.304 and 25.133 as noted above.

In one implementation the RAT weighting factor is given as a percentage ratio compared to other RATs. The sum of all RATs should be no more than 100%, and so the performance requirement is then adjusted according to the weight. There are various ways to implement such signalling, such as for example as a ratio or as a scale (for example, on a scale of 1-10 in which 1=10% and 10=100%). These are only non-limiting examples.

The IE will then have a list of weights for each RAT to be measured. The performance requirement will be scaled according to the relative weights, however signaled. For example 50% corresponds to the conventional UTRAN requirement whereby the UE has to measure 2 RATs simultaneously, but 25% will mean the UE cell search and measurement period requirements are extended by a factor of two as compared to conventional practice. In this manner the UE can spread the measurements, freeing more measurement occasions or natural DRX opportunities to be used to measure other RATs.

The scaling is performed such that the UE still uses the same number of measurement occasions or natural DRX opportunities to perform a measurement, but the total measurement/averaging may be spread over time, or delayed such as would be the case where one RAT is measured first.

One technical advantage of these teachings is that they allow measurements of LTE in coverage limited scenarios while the UE is in the CELL_FACH state. Another advantage is that these teachings allow the UEs to measure the legacy RATs without adverse impact on the legacy performance requirements (in case one RAT is dropped so the measurement set includes only two RATs). And a third technical effect is that these teachings allow the network operator full control over the requirements for the implementations where the network provides RAT-specific weighting factors, which means the legacy performance can be impacted minimally or more substantially depending on how far the signalled weights differ from the effect of conventional practice.

Figure 2:
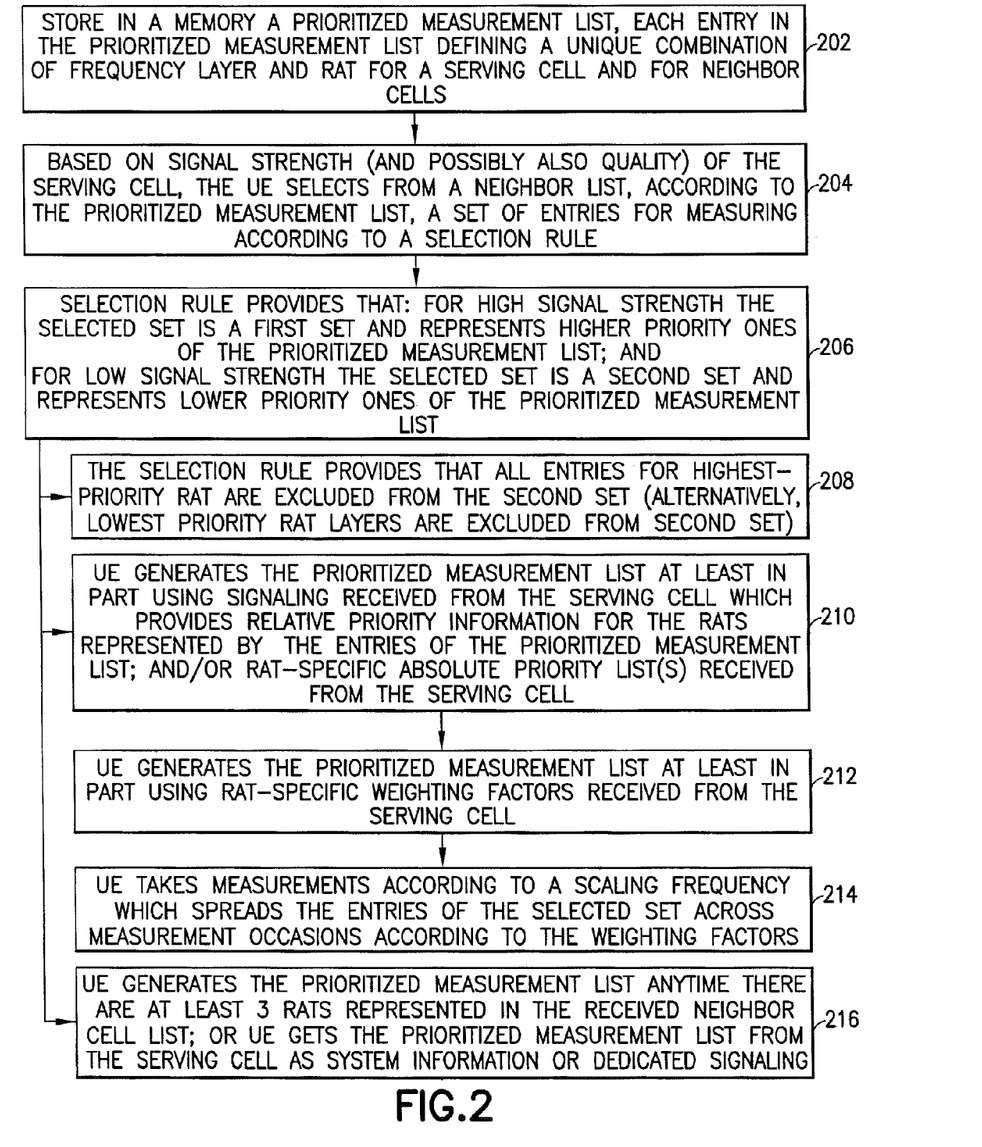
FIG. 2 is a logic flow diagram that illustrates the operation of a method, and a result of execution of computer program instructions embodied on a computer readable memory, in accordance with the exemplary embodiments of this invention.

FIG. 2 is a logic flow diagram which describes an exemplary embodiment of the invention from the perspective of the UE. FIG. 2 may be considered to illustrate the operation of a method, and a result of execution of a computer program stored in a computer readable memory, and a specific manner in which components of an electronic device/apparatus are configured to cause that electronic device or apparatus to operate. The various blocks shown in FIG. 2 may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

At block 202 the UE stores in its memory a prioritized measurement list, each entry in the prioritized measurement list defining a unique combination of frequency layer and RAT for a serving cell and for neighbor cells. At block 204, based on signal strength (and possibly also signal quality such as RSRQ or SINR) of the serving cell, the UE selects, from the neighbor list it get from the network according to the prioritized measurement list, a set of entries for measuring according to a selection rule. Block 206 gives details of the selection rule. For the case in which the signal strength of the serving cell is relatively high, the selected set is a first set and represents higher measurement priority ones of the prioritized measurement list; and for the case in which the signal strength of the serving cell is relatively low, the selected set is a second set and represents lower measurement priority ones of the prioritized measurement list.

The remainder of FIG. 2 illustrates more specific implementations for blocks 202, 204 and 206. Block 208 gives further detail for block 206 using the specific examples above. There are at least two RATs represented in the prioritized measurement list, and the selection rule provides that all frequency layers belonging to the RAT having a highest priority (such as EUTRAN in the above examples) are excluded from the selected second set. Alternatively, the rule may provide that all frequency layers having a lowest priority (such as GERAN in the above examples) are excluded from the second set.

Block 210 also follows from block 206, and provides that the UE generates the prioritized measurement list at least in part using signaling received from the serving cell which provides relative priority information for the RATs represented by the entries of the prioritized measurement list. Further detail of this is at block 212, in which the UE generates the list at least in part using weighting factors received from the serving cell which are specific for each of the RATs represented by the entries of the prioritized list. And block 214 gives yet further detail in which the UE uses the set of entries of the prioritized measurement list to take measurements of cells according to a measurement scaling frequency which spreads the entries of the set across measurement occasions according to the weighting factors. Another alternative at block 210 for how the UE generates the prioritized measurement list is from one or more RAT-specific absolute priority lists the UE receives from the network. These absolute priority lists are for the reselection of cells once those cells have been detected and measured.

Block 216 gives two different embodiments. In one the UE generates the prioritized measurement list from the neighbor list (mentioned at block 204) received from a wireless network anytime there are at least three radio access technologies represented in the received neighbor cell list. That is to say, the UE applies the rule only when the received neighbor list includes three (or more) RATs. This is the implicit rule mentioned above with the absolute priority. The other is the opposite embodiment, in which the UE wirelessly receives the prioritized measurement list in system information broadcast by the serving cell or from dedicated signaling received from the serving cell.

In a specific embodiment, FIG. 2 may be considered to represent actions of a modem which may be separable from or fixedly disposed within the above UE.

Figure 3:
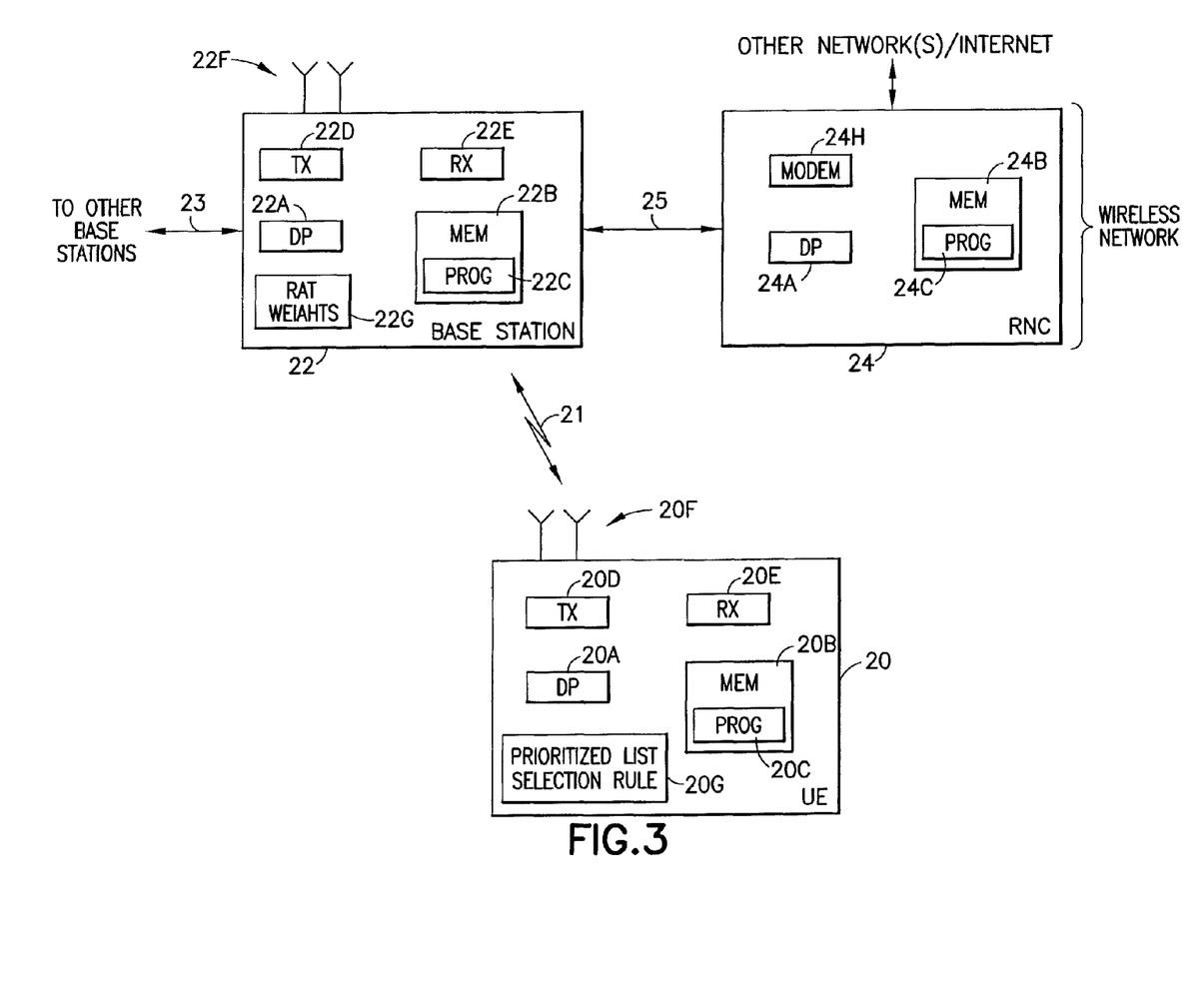
FIG. 3 is a simplified block diagram of the UE in communication with a wireless network illustrated as a base station and a RNC, which are exemplary electronic devices suitable for use in practicing the exemplary embodiments of this invention.

Reference is now made to FIG. 3 for illustrating a simplified block diagram of various electronic devices and apparatus that are suitable for use in practicing the exemplary embodiments of this invention. In FIG. 3 a wireless network (base station 22 and RNC 24) is adapted for communication over a wireless link 21 with an apparatus, such as a mobile terminal or UE 20, via a network access node such as a base station/NodeB 22 or relay station. The network may include a radio network controller RNC 24, which provides connectivity with further networks (e.g., a publicly switched telephone network PSTN and/or a data communications network/Internet).

The UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the base station 22 via one or more antennas 20F. Also stored in the MEM 20B at reference number 20G is the prioritized neighbor cell list and the rule or rules for selecting the set from it for taking measurements according to the above detailed embodiments and examples.

The base station 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F. The base station 22 also includes at unit 22G the RAT-specific weights which it sends to the UE in system information or dedicated signalling according to several of the specific embodiments detailed above. There is also a data and/or control path 25 coupling the base station 22 with the RNC 24, and another data and/or control path 23 coupling the base station 22 to other base stations/node Bs/access nodes.

Similarly, the RNC 24 includes processing means such as at least one data processor (DP) 24A, storing means such as at least one computer-readable memory (MEM) 24B storing at least one computer program (PROG) 24C, and communicating means such as a modem 24H for bidirectional wireless communications with the base station 22 via the data/control path 25. While not particularly illustrated for the UE 20 or base station 22, those devices are also assumed to include as part of their wireless communicating means a modem which may be inbuilt on an RF front end chip within those devices 20, 22 and which also carries the TX 20D/22D and the RX 20E/22E.

At least one of the PROGs 20C/20G in the UE 20 is assumed to include program instructions that, when executed by the associated DP 20A, enable the device to operate in accordance with the exemplary embodiments of this invention, as detailed above. The base station 22 may also have software stored in its MEM 22B to implement certain aspects of these teachings as detailed above, such as the examples above in which the base station sends to the UE the RAT-specific weighting factors. In this regard the exemplary embodiments of this invention may be implemented at least in part by computer software stored on the MEM 20B, 22B which is executable by the DP 20A of the UE 20 and/or by the DP 22A of the base station 22, or by hardware, or by a combination of tangibly stored software and hardware (and tangibly stored firmware). Electronic devices implementing these aspects of the invention need not be the entire UE 20 or base station 22, but exemplary embodiments may be implemented by one or more components of same such as the above described tangibly stored software, hardware, firmware and DP, modem, system on a chip SOC or an application specific integrated circuit ASIC.

In general, the various embodiments of the UE 20 can include, but are not limited to personal portable digital devices having wireless communication capabilities, including but not limited to cellular telephones, navigation devices, laptop/palmtop/tablet computers, digital cameras and Internet appliances.

Various embodiments of the computer readable MEMs 20B and 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A and 22A include but are not limited to general purpose computers, special purpose computers, microprocessors, digital signal processors (DSPs) and multi-core processors.

Some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus for use in selecting cells to be measured by a user equipment, the apparatus comprising a processing system comprising at least one processor and a memory storing computer program code, the processing system being arranged to:

store in the at least one memory a prioritized measurement list in which are represented at least two radio access technologies, each entry in the prioritized measurement list defining a unique combination of frequency layer and radio access technology for a serving cell and for neighbor cells; and based on at least signal strength of the serving cell, select from a neighbor list according to the prioritized measurement list a set of entries for measuring according to a selection rule, wherein the selection rule provides:

for the case in which the signal strength of the serving cell is relatively high, the selected set is a first set of the prioritized measurement list; and for the case in which the signal strength of the serving cell is relatively low, the selected set is a second set of the prioritized measurement list, the second set excluding all frequency layers of the prioritized measurement list belonging to the radio access technology having a highest priority or alternatively a lowest priority, and the second set different from the first set.

2. The apparatus according to claim 1, wherein the radio access technologies Evolved Universal Terrestrial Radio Access Network (E-UTRAN), Universal Terrestrial Radio Access Network (UTRAN) and GSM-Enhanced Data Rates for Global Evolution Radio Access Network (GERAN) are each represented in the prioritized measurement list, GERAN has the lowest priority and E-UTRAN has the highest priority.

3. The apparatus according to claim 1, in which the apparatus comprises a user equipment which generates the prioritized measurement list at least in part using at least one of:

signaling received from the serving cell which provides relative priority information for the radio access technologies represented by the entries of the prioritized measurement list; and at least one radio access technology specific absolute priority list which is received from the serving cell.

4. The apparatus according to claim 3, in which the relative priority information is expressed as weighting factors received which are specific for each of the radio access technologies represented by the entries of the prioritized measurement list.

5. The apparatus according to claim 4, in which the processing system is arranged to cause the apparatus to take measurements of cells corresponding to the selected set of entries according to a scaling frequency which spreads the entries of the selected set across measurement occasions according to the weighting factors.

6. The apparatus according to claim 3, in which the user equipment is arranged to wirelessly receive the prioritized measurement list in system information broadcast by the serving cell or from dedicated signaling received from the serving cell.

7. The apparatus according to claim 1, in which the apparatus comprises a user equipment which is configured to generate the prioritized measurement list from the neighbor list in the event that there are at least three radio access technologies represented in the neighbor list.

8. A method of selecting cells to be measured by a user equipment, the method comprising: storing in a computer readable memory a prioritized measurement list in which are represented at least two radio access technologies, each entry in the prioritized measurement list defining a unique combination of frequency layer arid radio access technology for a serving cell and for neighbor cells; and based on at least signal strength of the serving ceil, selecting from a neighbor list according to the prioritized measurement list a set of entries for measuring according to a selection rule, wherein the selection rule provides:

for the case in which the signal strength of the serving ceil is relatively high, the selected set is a first set of the prioritized measurement list; and for the case in which the signal strength of the serving ceil is relatively low, the selected set is a second set of the prioritized measurement list, the second set excluding all frequency layers of the prioritized measurement list belonging to the radio access technology having a highest priority or alternatively a lowest priority, and the second set different from the first set.

9. The method according to claim 8, wherein the radio access technologies Evolved Universal Terrestrial Radio Access Network (E-UTRAN), Universal Terrestrial Radio Access Network (UTRAN) and GSM-Enhanced Data Rates for Global Evolution Radio Access Network (GERAN) are each represented in the prioritized measurement list, GERAN has the lowest priority and E-UTRAN has the highest priority.

10. The method according to claim 8, in which the method is executed by a user equipment and the method further comprises the user equipment generating the prioritized measurement list at least in part using at least one of:

signaling received from the serving cell which provides relative priority information for the radio access technologies represented by the entries of the prioritized measurement list; and at least one radio access technology specific absolute priority list which is received from the serving cell.

11. The method according to claim 10, in which the relative priority information is expressed as weighting factors which are specific for each of the radio access technologies represented by the entries of the prioritized measurement list.

12. The method according to claim 11, in which method further comprises taking measurements of cells corresponding to the selected set of entries according to a scaling frequency which spreads the entries of the selected set across measurement occasions according to the weighting factors.

13. The method according to claim 10, in which the user equipment wirelessly receives the prioritized measurement list in system information broadcast by the serving cell or from dedicated signaling received from the serving cell.

14. The method according to claim 8, in which the method is executed by a user equipment and the method further comprises the user equipment generating the prioritized measurement list from the neighbor list in the event that there are at least three radio access technologies represented in the neighbor list.

15. A non-transitory memory storing a computer program, the computer program comprising a set of instructions which, when executed by a computing system, causes the computing system to perform the steps of:

storing in a computer readable memory a prioritized measurement list in which are represented at least two radio access technologies, each entry in the prioritized measurement list defining a unique combination of frequency layer and radio access technology for a serving cell and for neighbor cells; and based on at least signal strength of the serving cell, selecting from a neighbor list according to the prioritized measurement list a set of entries for measuring according to a selection rule, wherein the selection rule provides:

for the case in which the signal strength of the serving ceil is relatively higher, the selected set is a first set of the prioritized measurement list; and for the case in which the signal strength of the serving ceil is relatively lower, the selected set is a second set of the prioritized measurement list, the second set excluding all frequency layers of the prioritized measurement list belonging to the radio access technology having a highest priority or alternatively a lowest priority, and the second set different from the first set.

16. The memory according to claim 15, wherein the radio access technologies Evolved Universal Terrestrial Radio Access Network (E-UTRAN), Universal Terrestrial Radio Access Network (UTRAN) and GSM-Enhanced Data Rates for Global Evolution Radio Access Network (GERAN) are each represented in the prioritized measurement list, GERAN has the lowest priority and E-UTRAN has the highest priority.

17. The memory according to claim 15, wherein the set of instructions is arranged to cause the computing system to generate the prioritized measurement list at least in part using at least one of:

signaling received from the serving cell which provides relative priority information for the radio access technologies represented by the entries of the prioritized measurement list; and at least one radio access technology specific absolute priority list which is received from the serving cell.

* * * * *